(12) United States Patent
Harke et al.

(10) Patent No.: US 12,461,009 B2
(45) Date of Patent: Nov. 4, 2025

(54) METHOD AND MICROSCOPE FOR RECORDING TRAJECTORIES OF INDIVIDUAL PARTICLES IN A SAMPLE

(71) Applicant: ABBERIOR INSTRUMENTS GMBH, Gottingen (DE)

(72) Inventors: Benjamin Harke, Gottingen (DE); Lars Kastrup, Gottingen (DE); Christian Wurm, Gottingen (DE)

(73) Assignee: ABBERIOR INSTRUMENTS GMBH, Gottingen (DE)

( * ) Notice: Subject to any disclaimer, the term of this patent is extended or adjusted under 35 U.S.C. 154(b) by 121 days.

(21) Appl. No.: 18/265,308

(22) PCT Filed: Dec. 21, 2021

(86) PCT No.: PCT/EP2021/086970
§ 371 (c)(1),
(2) Date: Jun. 5, 2023

(87) PCT Pub. No.: WO2022/136361
PCT Pub. Date: Jun. 30, 2022

(65) Prior Publication Data
US 2024/0035950 A1 Feb. 1, 2024

(30) Foreign Application Priority Data
Dec. 21, 2020 (DE) .................. 10 2020 134 495.3

(51) Int. Cl.
*G01N 15/14* (2024.01)
*G01N 15/1429* (2024.01)
*G01N 15/1434* (2024.01)

(52) U.S. Cl.
CPC ..... *G01N 15/1425* (2013.01); *G01N 15/1429* (2013.01); *G01N 15/1434* (2013.01); *G01N 15/1456* (2013.01)

(58) Field of Classification Search
CPC .................. G01B 21/0076; G06T 2207/10064
See application file for complete search history.

(56) References Cited

U.S. PATENT DOCUMENTS

2011/0045993 A1 2/2011 Kent et al.
2014/0042340 A1 2/2014 Hell
(Continued)

FOREIGN PATENT DOCUMENTS

CN 109308457 A 2/2019
DE 10 2011 055 367 A1 5/2013
(Continued)

OTHER PUBLICATIONS

International Search Report for PCT/EP2021/086970 dated May 19, 2022.
(Continued)

*Primary Examiner* — Thanh Luu
(74) *Attorney, Agent, or Firm* — MOSER TABOADA (57) ABSTRACT

The invention is directed to a method for recording a motion trajectory of an individual particle in a sample and to a light microscope performing this method. Starting from an at least approximately known initial position, the particle is scanned with an intensity distribution of a scanning light comprising a local intensity minimum. When illuminated with the scanning light, the particle to be tracked generates a detectable light signal, from the intensity of which updated coordinates of the particle are calculated. According to the invention, the scanning is terminated when a second measured variable detected in parallel satisfies a termination criterion.

20 Claims, 3 Drawing Sheets

(56) References Cited

U.S. PATENT DOCUMENTS

| | | |
|---|---|---|
| 2018/0259458 A1* | 9/2018 | Hell .................. G02B 21/0036 |
| 2019/0234879 A1 | 8/2019 | Balzarotti et al. |
| 2020/0250396 A1* | 8/2020 | Horning ............... G06V 20/695 |
| 2020/0383577 A1 | 12/2020 | Schie et al. |
| 2020/0393378 A1 | 12/2020 | Hell et al. |
| 2021/0190691 A1 | 6/2021 | Sirat |
| 2022/0163440 A1 | 5/2022 | Pertsinidis |
| 2023/0003651 A1 | 1/2023 | Harke et al. |
| 2023/0101017 A1 | 3/2023 | Fischer et al. |

FOREIGN PATENT DOCUMENTS

| | | |
|---|---|---|
| DE | 10 2015 004 104 A1 | 9/2016 |
| DE | 10 2015 015 497 A1 | 6/2017 |
| DE | 10 2017 104 736 B3 | 8/2018 |
| DE | 10 2017 129 837 A1 | 6/2019 |
| DE | 10 2019 008 989 B3 | 6/2021 |
| DE | 10 2020 113 998 A1 | 12/2021 |
| WO | WO 2009/098272 A2 | 8/2009 |
| WO | WO 2020/198750 A1 | 10/2020 |
| WO | WO 2021/111187 A2 | 6/2021 |

OTHER PUBLICATIONS

N.P. Wells et al., "Time Resolved 3D Molecular Tracking in Live Cells", Nano Lett. 10, 4732-4737 (2010).

K. Gwosch et al. "MINFLUX nanoscopy delivers 3D multicolor nanometer resolution in cells", Nat. Methods 17, Feb. 2020, 217-224.

M. Weber et al. "MINSTED fluorescence localization and nanoscopy", bioRxiv, Nov. 1, 2020, 21 pages, doi:10.11.01/2020.10.31.363424.

F. Balzarotti et al., "Nanometer resolution imaging and tracking of fluorescent molecules with minimal photon fluxes", Science 355, Feb. 10, 2017, http:/science.sciencemag.org/, 80 pages, + Supplements.

L. Martinez-Munoz et al., "Separating Actin-Dependent Chemokine Receptor Nanoclustering from Dimerization Indicates a Role for Clustering in CXCR4 Signaling and Function", vol. 70,No. 1, Apr. 5, 2018, 106-119.

German Examination Notice for DE 10 2020 134 495.3 dated Dec. 4, 2021.

* cited by examiner

METHOD AND MICROSCOPE FOR RECORDING TRAJECTORIES OF INDIVIDUAL PARTICLES IN A SAMPLE

TECHNICAL FIELD OF THE INVENTION

The invention relates to a method for tracking individual particles in a sample over time using the MINFLUX principle. The invention further relates to a light microscope performing the method.

STATE OF THE ART

The observation and tracking of individual particles in a sample (single particle tracking, SPT) is an important technique for studying molecular dynamics in biological systems. Light-scattering particles, such as metallic nanoparticles, can be used for this purpose; however, fluorescent particles or single molecules of a fluorescent dye are most commonly used. Fluorescent dyes can also be used to label otherwise undetectable particles, making them accessible for particle tracking. Biological applications include the study of enzyme-catalyzed reactions, DNA transcription, ion channel activity, and vesicle trafficking.

The applicability of the methods used depends largely on the achievable observation period and the temporal resolution when observing individual particles. Microscope-based, imaging methods on the one hand and point detector-based methods on the other are known from the prior art. The former allow the observation of individual particles over a larger image area and thus the tracking of even freely diffusing particles over comparatively long periods of time. However, the achievable temporal resolution is limited by the frame rate of the camera, which is why an investigation of fast processes is not possible with this approach.

Conversely, high temporal resolutions down to the picosecond range can be achieved with point detector-based methods, particularly when using time-resolved single photon counting, but in many applications the observation period is limited to the dwell time of individual particles in the focus of the illumination light. The observation period is particularly short when particles are free to diffuse. To overcome this limitation, particles to be tracked, and in particular single molecules, are often immobilized, i.e., bound to a stationary support or held in place using optical tweezers. However, for use with optical tweezers, single biomolecules must be coupled to (larger) carrier particles, which severely limits applications in native, living systems.

Extending the observation period of an individual particle with a single point detector is alternatively possible by keeping the molecule actively in focus using an adjustable sample holder and closed loop control. Tracking of single fluorescent molecules was first realized by N. P. Wells et al. in "Time Resolved 3D Molecular Tracking in Live Cells," Nano Lett. 10, 4732 (2010), where Cy5-dUTP molecules in 92% glycerol, a very viscous medium, could be tracked in real time for about 100 ms. Application of the method in less viscous (and thus more practice relevant) media is not possible with the piezoelectric-based stages used in this work for tracking the sample, since the diffusion velocity of the dye molecules is considerably higher in less viscous media, so that individual dye molecules can no longer be tracked sufficiently quickly and quickly leave the capture range of the control for sample tracking. The maximum temporal length of the trajectories is also short at around 100 ms, which is due in particular to the limited photon budget, i.e. the limited number of fluorescence photons emitted by a dye molecule until final bleaching.

For faster tracking of individual particles and in particular individual dye molecules, fast beam deflection means, in particular electro-optical or acousto optical deflectors, are now available that achieve a positioning time in the (sub-) microsecond range, but are limited to a positioning range of a few micrometers. To be able to scan individual particles in a larger area of the sample, these fast, non-mechanical scanning means can be combined with galvanometer mirrors, which allow (slower) pre-positioning of the focused excitation light in a large area of the sample.

DE 10 2011 055 367 A1 describes a variant of single particle tracking known by the acronym MINFLUX, in which the particle is illuminated with a light distribution of a scanning light having an intensity minimum and the photons emitted by the particle are registered. The minimum is tracked to the particle moving in the sample by shifting the intensity distribution relative to the sample such that the rate of photons emitted from the particle remains minimal. As the confidence of the localization increases, the positions of the intensity minimum can be placed progressively closer around the tracked particle and the power of the scanning light can be increased, allowing for more precise localization.

The particular advantage of the MINFLUX method lies in its special photon efficiency, which allows precise localization of individual particles down to the single-digit nanometer range even with a comparatively small number of photons. Since the scanning is performed with an intensity minimum—ideally an intensity zero—of the light distribution and the intensity minimum is positioned only in a close range around the particles, the particles are exposed to only low light intensity. Quantitative analysis [see K. Gwosch et al. in "MINFLUX nanoscopy delivers 3D multicolor nanometer resolution in cells," Nat. Methods 17, 217 (2020)] shows that the standard deviation $\sigma$ of localization accuracy in the MINFLUX method follows the relationship $\sigma \propto 1/N^{k/2}$ where N the number of detected photons and k is the number of iteration steps. Therefore, already with four iterations $\sigma \propto 1/N^2$, i.e., the uncertainty of localization decreases with the square of the number of photons. In contrast, the standard deviation for the localization of individual particles from a wide-field image of the particles (for example, in STORM/PALM microscopy or also by scanning with a Gaussian light focus) decreases only with the square root of the number of N of the detected photons ($\sigma \propto 1/\sqrt{N}$). Due to this special photon efficiency, even from single fluorescent dye molecules, which emit only a very limited number of fluorescence photons until they bleach irreversibly, considerably more position determinations can be performed using the MINFLUX method than is possible with other methods.

Particularly when using fast scanning means, repeated position determinations of individual particles can be performed at very short intervals, with the currently available prior art about every 100 µs. Due to the high photon efficiency and the high localization speed, the MINFLUX method is therefore particularly suitable for real-time tracking of individual fluorescent dye molecules in the sample. In this context, tracking of individual dye molecules is possible even in low-viscosity media. Trajectories of individual dye molecules recorded using the MINFLUX method with more than 25,000 individual position determinations are known from the prior art.

DE 10 2017 104 736 B3 describes a variant of the MINFLUX method in which the scanning of the isolated fluorescent dye molecules is not performed by illuminating them with an intensity distribution of excitation light having a local intensity minimum, but with two essentially complementary intensity distributions of an excitation light and a fluorescence inhibition light. In this case, the intensity distribution of the excitation light comprises a local intensity maximum, while the intensity distribution of the fluorescence inhibition light comprises a local intensity minimum at the same location. Specifically, the fluorescence inhibition light may be STED light, which prevents excited fluorescent dye molecules from emitting fluorescence photons in the edge regions of the intensity distribution of the excitation light by triggering stimulated emission. Also in this embodiment of the MINFLUX method, the intensity of the fluorescence emitted by the dye molecule depends on the distance to the local intensity minimum of the fluorescence inhibition light, but here the fluorescence does not increase with increasing distance from the intensity minimum, but decreases. An experimental implementation of this concept was reported by M. Weber et al. in "MINSTED fluorescence localization and nanoscopy," bioRxiv, doi: 10.1101/2020.10.31.363424 (2020).

While long trajectories of individual particles with many positional determinations are desirable in principle, the question arises, however, whether the trajectories contain meaningful information for a given problem along their entire length. For example, an investigation of a possible interaction between a tracked particle and a binding site in the sample will not provide relevant information if the distance between the particle and the binding site becomes too large. Also, information derived from a trajectory may be irrelevant or even misleading if, during the trajectory acquisition, the cell enters a non-representative state (e.g., due to cell division or apoptosis). Superfluous scanning also leads to avoidable exposure of the sample to the scanning light and to an unnecessarily long measurement time.

Objective of the Invention

The objective of the invention is therefore to disclose a method and a light microscope for tracking the movement of an individual particle in a sample, in which the tracking of the particle is interrupted or terminated when the tracking of the particle no longer provides information relevant to a given problem. Thus, the objective of the method and light microscope according to the invention is to demonstrate a method that defines a suitable termination criterion for tracking the particle.

Solution

The task of the invention is solved by the recited claims.

DESCRIPTION OF THE INVENTION

The invention is based on the idea that when tracking the movement of a particle in the sample, a decision about which sections of the recorded trajectory contain information relevant to answering a given question often cannot be made from the data points of the trajectory alone, but that further information about the context in the sample is required for this purpose. This context may be spatial information about the (immediate) environment of the particle just tracked, or functional information characterizing the functional state of, for example, a cell organelle (e.g., the opening state of an ion channel) or the cell as a whole.

To this end, the invention comprises a method for recording a trajectory, i.e., a time-resolved location curve of an individual particle in a sample, wherein a second measured variable is detected in the sample and the recording of the trajectory is interrupted or terminated when the second measured variable or a control value calculated from the second measured variable satisfies a termination criterion. Such timely termination of recording of a trajectory is both time and photon efficient.

The particles to be tracked may be light-scattering particles, for example metallic nanoparticles, silica or latex nanoparticles, or—preferred in many applications—fluorescent particles. The term fluorescent particles is to be understood here in a broad sense; fluorescent particles also include, for example, single molecules of a reagent, a ligand, an active substance or a biomolecule (e.g. protein, DNA, lipid) labeled with a fluorescent dye, but also fluorescently labeled supramolecular structures, aggregates or molecular complexes such as micelles, vesicles or lipid rafts. Fluorescent particles also include molecular fluorophores, i.e., single molecules of fluorescent dyes and fluorescent quantum dots (Qdots). The decisive factor is that the particles occur in the form of discrete and largely identical units.

To carry out the process according to the invention, it must be ensured that the particles are present individually, i.e., that the distance between adjacent particles is above the optical diffraction limit, so that adjacent particles can be identified as separate objects in an optical image. The spacing requirement can be met, for example, by using particles in such a low concentration that they are sufficiently spaced from each other on a statistical average. Spatially separated fluorescent molecules of a fluorescent dye can also be generated by photoactivation and/or photo deactivation if the fluorescent dye can be light-induced to convert between a fluorescent state and a nonfluorescent state in at least one direction. Thus, by photoactivating a very small number of fluorescent dye molecules or photodeactivating the majority of the fluorescent dye molecules, a small number of dye molecules in the fluorescent state can be prepared that have the required distance from each other. The spacing requirement also applies to molecules of different fluorescent dyes that can be excited with excitation light of the same wavelength to fluoresce in an identical fluorescence wavelength range. With regard to suitable methods for separating fluorescent dye molecules in a sample, the skilled person can refer to comprehensive prior art for localization microscopy (PALM, STORM and related methods).

To record the trajectory of an individual particle according to the method of the invention, knowledge of its initial position at the start of the measurement is required, at least approximately. Initial coordinates can be obtained, for example, by scanning the sample with focused light in a conventional laser scanning or from a previously acquired wide-field image; specific procedures for this can also be found in the prior art for PALM, STORM and MINFLUX microscopy.

Starting from the initially determined coordinates of the particle, it is scanned with a scanning light at one or more scanning positions, wherein the intensity distribution of the scanning light in the sample comprises a local intensity minimum—ideally an intensity zero point. When in the following reference is made to a scanning position, the position of this local minimum is meant. When illuminated with the scanning light, the particle to be tracked generates a detectable light signal, for example a scattered light signal in the case of light-scattering particles or a fluorescence signal in the case of fluorescent particles.

When scanning the particle with the scanning light, a light signal in the form of a number of or an intensity is detected at each scanning position as a first measured variable. Depending on whether the particle is located in the center of a scanning position and thus in the intensity minimum or near the intensity minimum of the scanning light or whether it is located further away from the intensity minimum and thus exposed to a higher intensity of the scanning light, the detected light signal turns out to be lower or higher. In this respect, the detected photon number or light intensity represents a measure of the distance of the particle from the intensity minimum and is used to determine subsequent scanning positions and updated coordinates of the scanned particle. The determination of updated coordinates of the particle can be done after a fixed or a variable (i.e., adjusted in the course of the scanning) number of scanning positions, after each single scanning position or even after each detected photon. By repeatedly localizing the particle and redefining the following scanning position(s), the scanning follows the movement of the particle in the sample and thus reproduces the trajectory of the particle.

The previously described method steps essentially correspond to the prior art single molecule tracking method using the MINFLUX method as described, for example, by F. Balzarotti et al. in "Nanometer resolution imaging and tracking of fluorescent molecules with minimal photon fluxes," Science 355, 606 (2017).

The method according to the invention now differs from the prior art in that a second measured variable is recorded in the sample during the recording of the trajectory of the particle and the recording of the trajectory is interrupted or terminated if the second measured variable or a control value calculated from the second measured variable fulfills a termination criterion. In the simplest case, the termination criterion is that the second measured variable or the control value falls below a minimum value or exceeds a maximum value. Optionally, the scanning can be continued if the second measured variable or the control value exceeds the minimum value again or falls below the maximum value again, wherein in practice a hysteresis can be provided. More complex criteria can also be specified as termination criteria, in particular also taking into account the history of the second measured variable.

According to the invention, the second measured variable is detected during the recording of the trajectory at a location in the sample, wherein the detection may take place continuously, i.e., asynchronously to the scanning of the particle, or may be integrated into the scanning process of the particle. Although not mandatory, the second measured variable is thereby preferably detected at least once per update of the particle coordinates. The detection of the second measured variable may take place in a point-like manner at the respective current coordinates of the particle or at the respective current scanning position, but it is also possible to detect the second measured variable in an extended area in the sample and to average it over this area, for example in a vicinity of the last determined coordinates of the particle or in a fixed, previously determined area in the sample. This area may be defined, for example, by the contour of a cell or a cell organelle, for example the cell nucleus.

The purpose of the termination criterion is to terminate or at least temporarily interrupt the recording of the trajectory, for example if further localizations of the observed particle do not (any longer) provide any information relevant for a given question or if the sample changes in such a way that the information derived from further localizations is no longer comparable with the information derived from earlier localizations, i.e. it is no longer meaningful for the experiment or may even lead to false conclusions. By parallel detection of the second measured variable and the application of a termination criterion, superfluous scans and thus unnecessary exposure of the sample to the scanning light can be avoided. At the same time, the measurement duration can be reduced, or trajectories of more particles can be recorded in a given time. For many problems requiring statistical analysis of a large number of trajectories, this time advantage allows larger data sets to be acquired and analyzed without increasing the overall measurement time.

In a preferred embodiment of the method according to the invention, the particle is scanned for each position determination at several scanning positions in a close range of typically 250 nm around the last determined coordinates of the particle, wherein the polygon (in the two-dimensional case) or polyhedron (in the three-dimensional case) formed by the scanning positions encloses the last determined particle coordinates. This ensures that an unambiguous localization of the particle is possible. The photon number or light intensity emitted by the particle at the scanning positions allows updated coordinates of the particle to be calculated; for this purpose, the skilled person can refer to known methods and algorithms from the prior art (in particular for MINFLUX technology). The steps described are carried out repeatedly, i.e., further scanning positions are determined in a close range around the respective current coordinates, the particle is scanned with the scanning light at the newly determined scanning positions, light emitted by the particle is registered at each of the scanning positions, and updated coordinates are determined. The determination of the respective subsequent scanning positions after each localization step is thereby based on the last determined coordinates of the particle. Optionally, the optical power of the scanning light can also be increased. By repeatedly localizing the particle and redefining the scanning positions, the scanning follows the movement of the dye molecule in the sample and thus maps the trajectory of the particle.

In an alternative embodiment, updated coordinates of the particle and the subsequent scanning position are determined after each scanning of the particle at a scanning position. Complete localization of the particle from the photons detected at a single scanning position alone is not possible; however, based on the scanning history, the relative location of the intensity minimum to the presumed current position of the particle, and the photon number or light intensity detected at the current scanning position, it is possible to infer in which direction the scanning position must be shifted.

The determination of the scanning positions and the intensity of the scanning light is highly dependent on the diffusion or transport velocity of the particle in the sample and the frequency with which the particle can be localized. While a dense arrangement of scanning positions around the current position of the particle and a high optical power of the scanning light allows a precise localization and is therefore desirable, at the same time the risk increases that the particle leaves the capture range of the localization between successive localizations. While in the localization of static, immobile dye molecules the scanning positions can be successively shifted closer to the location of the dye molecule, the optical power of the scanning light can be increased, and thus the localization accuracy can be increased, this is not arbitrarily possible in the tracking of particles in motion. Rather, the scanning positions and the optical power of the scanning light must be adjusted so that the particle remains within the capture radius between successive localizations. The higher the localization frequency and the lower the movement speed of the particles, the closer the scanning positions can be arranged around the particle and the higher the optical power of the scanning light can be adjusted. Both parameters can also be adjusted between successive localizations, i.e., while the trajectory is being recorded.

In a preferred embodiment of the method according to the invention, the second measured variable is an optical measured variable, in particular a fluorescence signal detected in a second detection channel. This fluorescence signal may originate from a (further) fluorescent dye in the sample and in particular serve to mark a structure in the sample. However, it may also be an autofluorescence signal, i.e., an intrinsic fluorescence signal of a cell. For example, if the nucleus, the cell membrane, the cell organelle, a structural protein, an ion channel, a lipid raft, or another structure of a cell present in the sample is stained with a (further) fluorescent dye, its fluorescence provides contextual information when tracking individual particles in the sample. The absence of this staining or falling below a minimum fluorescence signal of this staining at the location of a scanned particle may indicate, for example, that the scanned particle is outside of (or has left) a cell or region of interest in a cell and may therefore serve as a termination criterion for tracking the particle. For example, to study ligand-receptor interactions, the ligand and receptor may be stained with different fluorescent dyes and individual molecules of the fluorescently labeled ligand may be tracked in the sample using the method of the invention. In this regard, tracking of individual fluorescently labeled ligand molecules may be limited to periods of time during which, as indicated by the fluorescent (control) signal from the receptor, the ligand is in the immediate vicinity of a receptor and can interact with it. Tracking may be terminated when the control value indicates that the ligand molecule has moved away from the corresponding receptor.

The termination criterion does not necessarily have to be defined directly on the second measured variable, but can also be related to a control value calculated from the second measured variable, the calculation of which may include other measured variables. In particular, the control value may be calculated from a fluorescence ratio in two detection channels in which the fluorescence is detected in different detection wavelength ranges. An advantageous embodiment results when the fluorescence of ratiometric indicator dyes is used for the calculation of the control value. The ratio of the fluorescence signals of such indicator dyes in two wavelength ranges may, for example, provide information about ion concentrations (in particular calcium, magnesium, zinc and sodium ions), pH values or membrane potentials. A termination criterion related to such a control value allows single particle tracking to be restricted not only to spatially limited areas in sample, but also to specific functional states of a cell or cell organelle, e.g., the opening state of an ion channel or the integrity of a cell membrane. Suitable indicator dyes or fluorescence-based reagents (e.g., fluorescence ubiquitination cell cycle indicator, FUCCI) may also be used to assess the status of cells with respect to cell cycle progression and division or cell viability or cell vitality (for example LIVE/DEAD assays, ThermoFisher Scientific). This may involve fluorescent double staining for simultaneous detection of both apoptosis and necrosis, so that cells may be classified as dead, necrotic or apoptotic depending on the fluorescence signal in one or both fluorescence channels. If the control value is derived from the fluorescence of one or more of these fluorescent cell status, vitality or viability markers, the tracking of individual fluorescent particles according to the method of the invention may be restricted to intact cells or to observation periods in which the observed cells can be classified as healthy or are in a certain phase of the cell cycle. In this way, misinterpretations of measurement data that may arise from the recording of non-representative data can be avoided.

In addition to fluorescence intensity, other parameters of fluorescence emission may be used to define a termination criterion, in particular fluorescence lifetime or fluorescence anisotropy. These parameters are often sensitive to changes in the binding state or molecular environment of a dye molecule or a molecule or particle labeled with the fluorescent dye as a result of reduced mobility or changes in possible reaction pathways of fluorescence quenching.

When using fluorescent particles, an alternative embodiment of the method according to the invention may also be selected, in which the scanning light is formed by a superposition of excitation light known from STED microscopy and an intensity distribution of a fluorescence inhibition light comprises the local intensity minimum, which inhibits fluorescence emission from focal edge regions. In this context, fluorescence inhibition light means any type of light that prevents, reduces or completely suppresses fluorescence emission from the fluorescent particles. In particular, the fluorescence inhibition light may be stimulation light that induces stimulated emission of electronically excited dye molecules, thereby converting the dye molecules (back) to the electronic ground state and thus preventing them from spontaneous fluorescence emission. Also in this configuration, scanning of individual fluorescent particles provides a fluorescence signal dependent on the distance of the particle from the intensity minimum of the fluorescence inhibition light. However, the dependence of the signal strength on the distance is inverse, i.e., the fluorescence signal decreases with increasing distance from the intensity minimum of the fluorescence inhibition light.

In addition to fluorescence, the second measured variable for deriving the termination criterion may also be another optical measured variable, in particular a Second Harmonic Generation (SHG) signal, a Third Harmonic Generation (THG) signal, a Rayleigh or Raman scattered light signal, a Coherent Anti-Stokes Raman Scattering (CARS) signal, a reflected light signal, a Differential Interference Contrast (DIC) signal or a Polarization Contrast signal. The advantage of using one of these optical metrics to establish a stopping criterion is that no (further) staining of the sample with a fluorescent marker is required, and these signals are not subject to photobleaching. Although specificity comparable to targeted fluorescent labeling cannot be achieved with these contrast modalities, some of the contrast modalities still show some selectivity. For example, SHG signals do not arise at structures with a molecular center of symmetry, whereas certain non-centrosymmetric structures (e.g., collagen, myosin, tubulin) provide a particularly high signal in SHG contrast.

To generate a second optical measured variable, the sample is usually illuminated in addition to the scanning light with further light whose properties are matched to the respective contrast modality and/or to the scanning light. Thereby, the further light should selectively excite the signal of the second optical measured variable, but not the emission of photons by the tracked particles. Therefore, the further light normally differs in wavelength from the scanning light. When using an SHG or THG signal as the second measured variable, the wavelength for exciting these signals is usually in the red or infrared spectral range, respectively, so that decoupling from the scanning light that produces fluorescence or light scattering by the particles is straightforward. The light for excitation of the second measured variable may be directed into the sample together with the scanning light through a single objective; however, it is also possible to illuminate the sample with the additional excitation light through a separate optical system. This separate optic may be a second objective that is opposite or at an angle to the objective used to illuminate the sample with the scanning light, such that the scanning light and the additional excitation light used to generate the second measured variable intersect in the sample. In this case, the beams intersect at an angle between 15° and 165°, preferably at an angle between 45° and 135°, and particularly preferably at an angle between 80° and 100°. With such an illumination of the sample (as realized, for example, in a light sheet microscope), the exposure of the sample to the additional excitation light may be reduced, the spatial resolution of the second measured variable may be improved, and a signal background created by the additional excitation light when scanning the sample may be reduced.

The second measured variable may also be a non-optical quantity. For example, this quantity may be an electrical measured variable, in particular an electrical voltage, an electrical current, an electrical resistance, an electrical capacitance, an electrical inductance, or a frequency, a phase, or an amplitude of an electrical voltage, an electrical current, or an alternating electromagnetic field. For example, an electric current in a sample may be measured in a patch clamp arrangement in which a micropipette is used to electrically isolate a single ion channel in the cell membrane of a cell under investigation from the surrounding medium, and the current through the ion channel is measured with an electrode. After amplification and processing of the detected current with a sensitive measurement amplifier to a control value, a termination criterion for carrying out the method according to the invention may be determined on the basis of this control value.

The invention further relates to a light microscope configured to carry out the method according to the invention. For this purpose, the light microscope comprises an objective and a light source for scanning light with which the particle in a sample can be excited to emit photons. According to the invention, the scanning light comprises a local intensity minimum in the sample, which is generated with the aid of beam shaping means arranged in the beam path of the scanning light. Such beam shaping means are known to the skilled person from the prior art; exemplary are phase filters or programmable phase modulators (spatial light modulator SLM), which are also used in STED microscopy, for example. The light microscope further comprises a scanning device with which the scanning light can be positioned in the sample and particles in the sample can be scanned at different scanning positions.

The light microscope comprises a detection channel that detects a first, optical measured variable from the sample. This optical measured variable is the light signal emitted by the particle to be tracked as a result of illumination with the scanning light, typically a scattered light signal or a fluorescence signal. A particularly suitable detector for this purpose is an avalanche photodiode operated in photon counting mode, which may have a particularly high sensitivity. However, an analog photomultiplier may also be used as a detector, as long as it has sufficient sensitivity for single-molecule detection. According to the invention, the light microscope also comprises a detection channel for detecting a second measured variable in the sample; this second measured variable is used to determine the termination criterion when carrying out the method according to the invention.

If the light microscope is configured for recording movement trajectories of fluorescent particles, i.e. it is a fluorescence microscope, the scanning light comprises at least one fluorescence excitation light with which the particles can be excited to fluorescence. A particular embodiment results when the scanning light is formed by superimposing the fluorescence excitation light and a fluorescence inhibition light from another light source, wherein (only) the fluorescence inhibition light comprises the local intensity minimum in the sample. As before, fluorescence inhibition light means any kind of light suitable to prevent, reduce or completely suppress the fluorescence emission of a fluorescent dye. In particular, the fluorescence inhibition light may be stimulation light that induces stimulated emission of electronically excited dye molecules. Also in the latter embodiment, the scanning of individual fluorescent particles provides a fluorescence signal dependent on the distance of the particle from the intensity minimum of the fluorescence inhibition light; however, the dependence of the signal strength on the distance is inverse, i.e., the fluorescence signal decreases with increasing distance from the intensity minimum of the fluorescence inhibition light.

If the light microscope is configured to record motion trajectories of light-scattering particles, the scanning light is used to generate a scattered light signal at the particles, wherein the scattered light signal may have the same wavelength as the scanning light (Rayleigh scattering) or a wavelength shifted relative to the scanning light (Rayleigh scattering, coherent anti-Stokes Raman scattering). The light microscope may also have multiple contrast modes that can be used in parallel or alternatively.

In order to exploit the potential of the method with regard to the achievable localization accuracy, a positioning accuracy of 1 nm or below with a corresponding reproducibility is regularly required from the scanning device. On the other hand, positioning times in the microsecond range are preferred in order to be able to achieve fast scanning and a rapid sequence of localizations of the particle. These precision and speed requirements for the scanning device of the light microscope according to the invention cannot be met or can only be met insufficiently with mechanical beam deflection units such as galvo mirrors alone. Beam deflection units that do not require moving parts, such as electro-optical deflectors (EOD) or electro-acoustic deflectors, are therefore suitable for the scanning device. With these, the desired positioning times can be easily achieved, but the maximum deflection angles are very limited. For this reason, a preferred embodiment of the light microscope according to the invention comprises both a galvo scanner in the beam path, with which the beam can be positioned over larger image fields, and an electrooptical deflector, with which the (fast) scanning of the individual particles is performed. Alternatively, there may be a device that integrates the functionality of the scanner and the beam deflector; such a device may be formed by a deformable mirror, for example. In further alternative embodiments, the function of the scanner could be performed, for example, by a movable sample stage.

In a preferred embodiment of the light microscope, the second measured variable is also an optical measured variable, for example a (further) fluorescence of a (further) fluorescence marker in the sample. The detection of this (further) fluorescence is preferably performed in a different wavelength range than the emission of the particle as a result of the illumination with the scanning light, in order to be able to separate both quantities from each other. Provided that a temporally or spectrally separated excitation of the emission of the particle and the (further) fluorescence marker is possible, both detection channels can, however, also be designed identically or not separately. In addition to fluorescence, other optical signals may also be detected as a second measured variable, in particular second harmonic generation signals (SHG), third harmonic generation signals (THG), Rayleigh or Raman scattered light signals, coherent anti-Stokes Raman scattered light signals (CARS), reflection light signals, differential interference contrast signals (DIC) or polarization contrast signals.

Most of the embodiments in which the second measured variable is also an optical measured variable require one or more further light sources with which the signal detected as the second measured variable is generated in the sample. This further light source(s) may be, for example, lasers for exciting a fluorescence or ultrashort pulse lasers for generating a SHG or THG signal. The light from the further light source(s) may be directed into the sample through a single objective together with the scanning light; however, it is also possible to illuminate the sample with the light from the further light source(s) through a separate optical system. This separate optic may be a second objective, which may be opposite the objective for illuminating the sample with the scanning light, or may be arranged at an angle to the latter, so that the scanning light and the light for generating the second measured variable intersect at an angle between 15° and 165°, preferably at an angle between 45° and 135°, and particularly preferably at an angle between 80° and 100° in the sample. Such a configuration is realized, for example, in a light sheet microscope.

In an alternative embodiment, the second measured variable is a non-optical measured variable. Preferred non-optical measured variables are, in particular, electrical measured variables, i.e., electrical voltages, electrical currents, electrical capacitances, electrical inductances or frequencies, amplitudes or phases of electrical voltage, electrical currents or alternating electromagnetic fields. An electric current may be measured, for example, in a patch clamp arrangement, in which a micropipette is used to electrically isolate a single ion channel in the cell membrane of a cell to be investigated from the surrounding medium, and the current through the ion channel is measured with an electrode and, after processing, is converted with a sensitive measurement amplifier into a control value for carrying out the method according to the invention.

Advantageous further embodiments of the invention result from the claims, the description and the drawings and the associated explanations to the drawings. The described advantages of features and/or combinations of features of the invention are merely exemplary and may have an alternative or cumulative effect.

With regard to the disclosure content (but not the scope of protection) of the original application documents and the patent, the following applies: Further features are to be taken from the drawings—in particular the relative arrangements and effective connections shown. The combination of features of different embodiments of the invention or of features of different claims is also possible in deviation from the selected back relationships of the claims and is hereby suggested. This also applies to such features which are shown in separate drawings or are mentioned in the description thereof. These features can also be combined with features of different claims. Likewise, features listed in the claims may be omitted for further embodiments of the invention, but this does not apply to the independent claims of the issued patent.

The reference signs contained in the claims do not represent a limitation of the scope of the objects protected by the claims. They merely serve the purpose of making the claims easier to understand.

DESCRIPTION OF THE FIGURES

Figure 1:
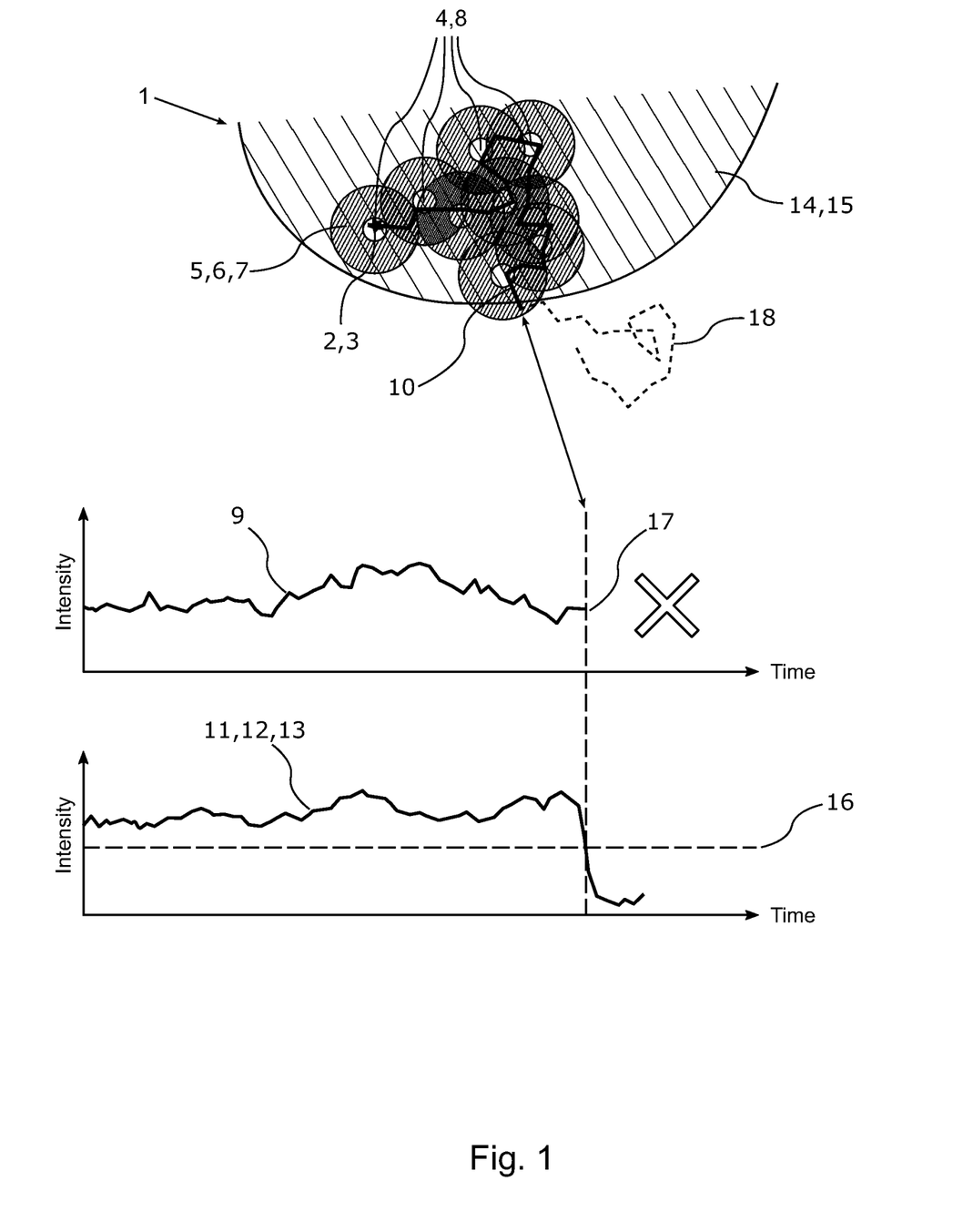
FIG. 1 shows schematically the sequence of the method according to the invention.

FIG. 1 shows a section of a cell 1 within which there is a particle 2 whose movement is to be tracked. The initial position 3 of this particle is at least approximately known (for example from a previously recorded wide-field image not shown here), so that scanning of the particle 2 can be started at the initial position 3. For this purpose, the particle is illuminated by a scanning light 5 at a plurality of scanning positions 4, only some of which are drawn in the figure as examples. According to the invention, the scanning light 5 comprises an intensity distribution 7 with a local intensity minimum 8. Specifically, the particle 2 here is a fluorescent particle that is excited to emit a fluorescence 9 when illuminated by the scanning light 5, which is thus an excitation light 6. The scanning light 5 could alternatively be a superposition of excitation light 6 with an intensity distribution 7 of fluorescence inhibition light, in particular stimulation light, having a local intensity minimum 8. Alternatively, the particle could also be a light-scattering particle. Instead of fluorescence 9, a scattered light signal would then be detected when the particle 2 is illuminated with the scanning light 5.

At each of the scanning positions 4, the fluorescence 9 emitted by the fluorescent particle 2 is detected, and based on the last scanning position(s) and the respective detected number(s) of fluorescence photons or the detected fluorescence intensity, updated coordinates of the fluorescent particle 2 are determined and one or more further scanning positions 4 are set. In this case, the updating of the coordinates of the particle 2 can take place in each case after the scanning at several scanning positions 4, but it is also possible to react to each individual detected fluorescence photon by updating the coordinates of the fluorescent particle 2 and determining the subsequent scanning position(s). By joining the successively determined coordinates, the trajectory 10 of the fluorescent particle 2 is thus created.

According to the invention, a second measured variable 11 is detected as a control value 12 during the scanning of the fluorescent particle 2, in this case also a fluorescence 13 of a further fluorescent dye 14 with which a staining 15 of the cell 1 was carried out. The further fluorescent dye 14 is selected in such a way that its fluorescence 13 occurs in a different wavelength range than the fluorescence 9 of the particle 2 and does not influence the fluorescence 9 detected by the particle 2 at the scanning positions 4. Provided that a fluorescence 13 of this further fluorescent dye 14 above a minimum value 16 is detected at the respective current scanning position 4, this indicates that the tracked particle 2 is moving within the cell 1, and the recording of the trajectory 10 by scanning the particle 2 is continued. However, as soon as the fluorescence 13 of the fluorescent dye 14 falls below the minimum value 16, this indicates that the particle 2 is outside the cell 1, and a termination 17 of scanning occurs. The further trajectory 18 of the particle 2 outside the cell 1 is not followed further.

Figure 2:
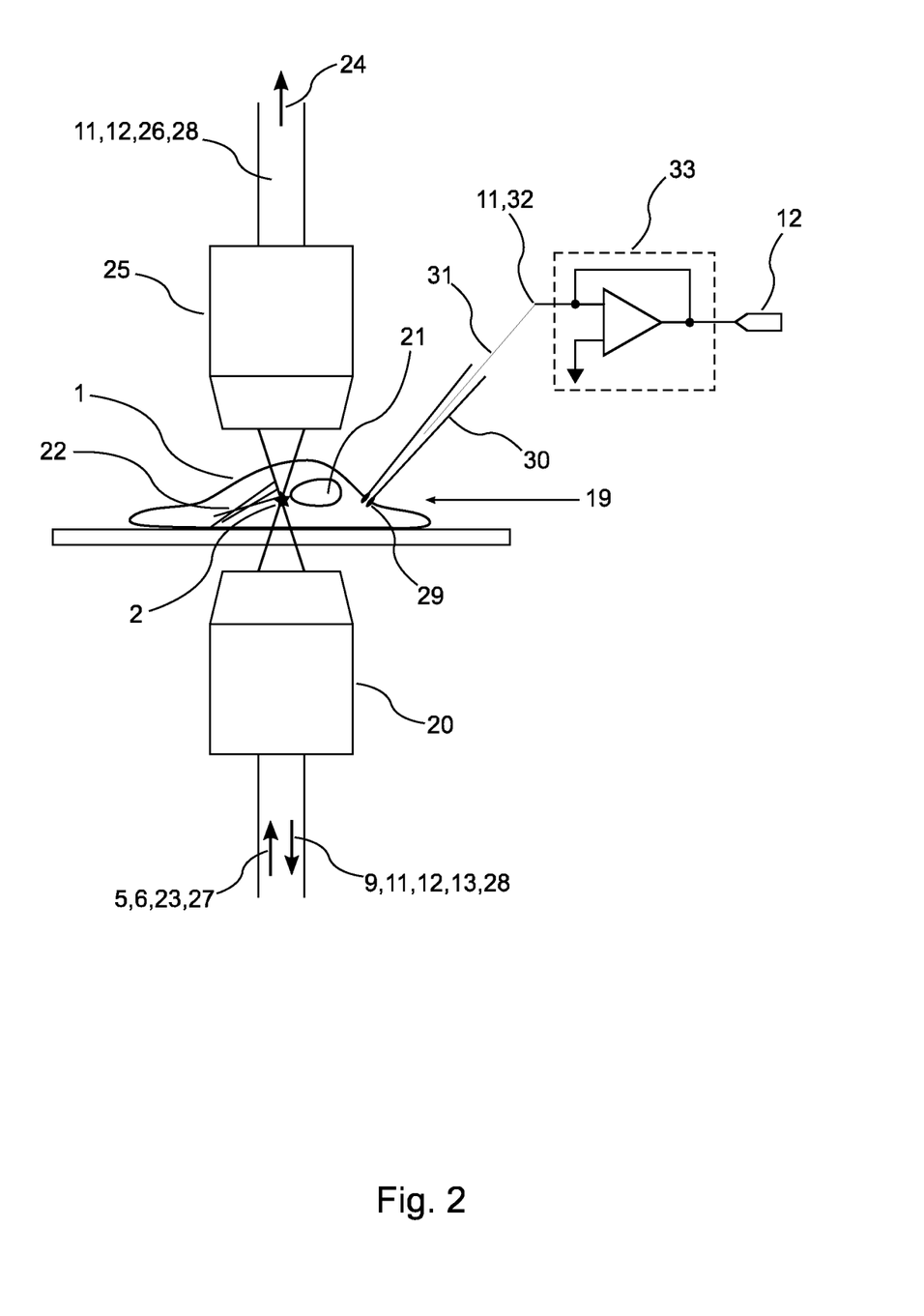
FIG. 2 shows different possibilities for recording a second measured variable.

FIG. 2 schematically shows a selection of different second measured variables 11 to define a termination criterion for tracking individual particles 2 in the sample 19. Although a control value can also be derived from several measured variables, the measured variables shown in the figure are primarily to be regarded as alternatives.

In the embodiment shown, the sample 19 is illuminated from below by the scanning light 5 via an objective 20 (inverse configuration). The sample contains a cell 1 in which the cell nucleus 21 and some filaments 22 are shown as examples of the cell organelles of cell 1. Further shown is a fluorescent particle 2 whose trajectory is recorded by scanning with the scanning light 5 at different scanning positions in the cell 1. For this purpose, the focused scanning light 5 in the sample 19 is shifted to the scanning positions by tilting the light beam 23 of the scanning light 5 with a beam deflection device (not shown). The fluorescence 9 emitted from the fluorescent particle 2 is collected by the objective 20 and detected by a detector (not shown).

During the scanning and tracking of the fluorescent particle 2 in the sample 19, a recording of a second measured variable 11 is made to establish a termination criterion for the scanning. This second measured variable 11 may also be a fluorescence 13 of a second fluorescent dye used to label individual components (e.g., organelles) of the cell 1 or the entire cell 1. Excitation light 6 required to excite this second fluorescent dye may be irradiated into the sample 19 in a common light beam 23 with the scanning light 5; the fluorescence 13 of the second dye may also be collected by the objective 20. The fluorescence 13 then serves as a control value 12, based on which a termination criterion for scanning and tracking the fluorescent particle 2 is established. This termination criterion may be, for example, that the control value 12 falls below a minimum value, indicating that the fluorescent particle 2 has moved away from the cell 1 or cell organelle labeled with the second fluorescent dye.

Instead of a fluorescence 13, the second measured variable 11 may also be transmitted light 26 collected in transmission direction 24 with a second objective 25 and detected by a further detector (not shown), the intensity of which serves as a control value 12 for determining the termination criterion. The transmitted light 26 may be the scanning light 5 transmitted through the sample, but it is also possible to irradiate a further illumination light 27 into the sample 19 with the scanning light 5. The illumination with the further illumination light 27 may take place not only as bright field illumination but also in the form of dark field illumination; in this way, if necessary, a better contrast of the control value may be achieved. Also, the transmitted light contrast can be implemented as polarization contrast by arranging polarizers in the illumination and transmitted light beam paths. Finally, the illumination light 27 may also be selected in such a way that a non-linear optical signal, in particular an SHG signal 28 (second harmonic generation) or a THG signal (third harmonic generation) is generated in the sample.

The second measured variable 11 does not necessarily have to be an optical measured variable. An electrical measured variable, in particular an electrical current 32 or an electrical voltage, may also serve as a control value 12, for example. In the illustration, the derivation of a current through an ion channel 29 in a patch clamp arrangement is shown as an example. For this purpose, a single ion channel 29 is isolated from the surrounding medium with a micropipette 30, and the ion current through the ion channel 29 is derived with an electrode 31 and detected as an electric current 32. The signal processed by an amplifier 33 may serve as a control value 12 to set a termination criterion for scanning and tracking the fluorescent particle 2 in the sample 19. In the example shown, tracking of the fluorescent particle 2 can thus be limited to intervals in which the ion channel 29 is active.

Figure 3:
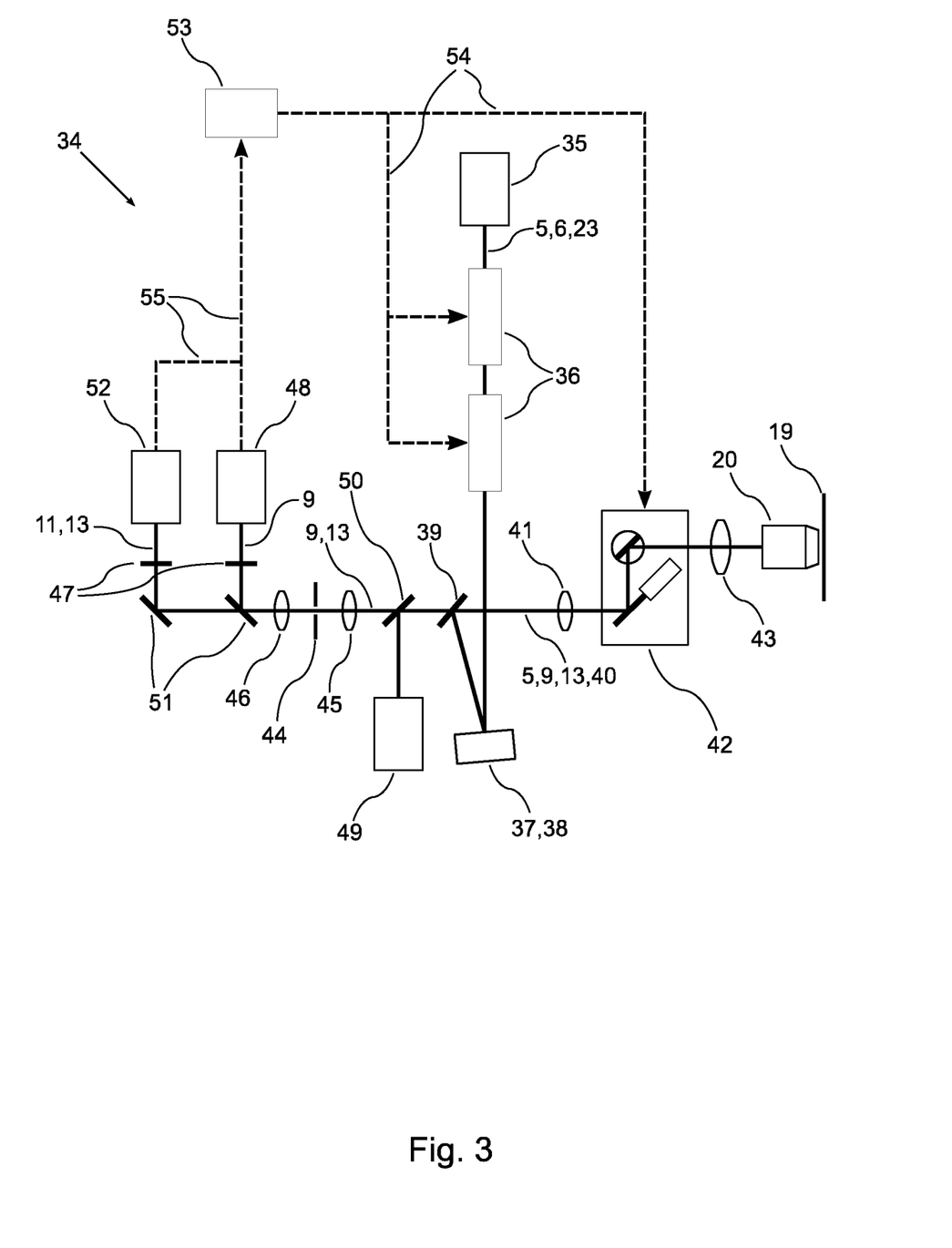
FIG. 3 shows a light microscope according to the invention.

FIG. 3 schematically shows the setup of a light microscope, which is designed here as a fluorescence microscope 34, for carrying out the method according to the invention. The laser light source 35 provides scanning light 5, which here is excitation light 6 for fluorescence excitation. The light beam 23 of the scanning light 5 passes through a beam deflection device, here implemented in the form of two electro-optical deflectors (EGDs) 36 connected in series for deflecting the light beam 23 in the horizontal and vertical directions, respectively. After passing through the EODs 36, the wavefront is shaped by a separate phase modulation element 37, here in the form of a liquid crystal modulator 38 (spatial light modulator, SLM), in such a way that, when subsequently focused by the objective 20, an intensity distribution of the scanning light 5 in the sample 19 comprising a local intensity minimum results. The light beam reflected or diffracted by the liquid crystal modulator 38 is coupled into a main beam path 40 of the fluorescence microscope 34 by a beam coupler 39. The beam coupler 39 is advantageously designed as a narrow-band reflecting dielectric notch filter whose reflection range overlaps as little as possible with the wavelength range of the fluorescence 9, so that only small portions of the fluorescence 9 running in the main beam path 40 in the opposite direction to the scanning light 5 are reflected out of the main beam path 40. The scanning light 5 is directed into the rear aperture of the objective 20 by a scanning lens 41, a scanner 42, and a tube lens 43.

In the configuration shown, the galvanometer-based scanner 42 serves a coarse positioning of the focused scanning light 5 on a fluorescent particle in the sample which is comparatively slow, but possible over a large field of view, while the EODs 36 serve the fast positioning of the intensity minimum in the close range around the fluorescent particle. In this regard, the EODs 36 allow positioning at high speed, but with a positioning range limited to a few micrometers. The fluorescence 9 received by the objective 20 from the sample 19 propagates along the main beam path 40 in the opposite direction to the scanning light 5. The fluorescence 9 is focused by a lens 45 through a confocal pinhole 44, collimated by another lens 46, separated from scattered light by a filter 47 and detected by a detector 48.

A second fluorescence channel is provided in the fluorescence microscope 34 for detecting the fluorescence 13 of a second fluorescent dye, the fluorescence 13 being the second measured variable 11 for establishing a termination criterion for scanning individual fluorescent particles in the sample 19. For this purpose, the fluorescence microscope 34 comprises a further light source 49, the light from which is coupled into the main beam path 40 by a second beam coupler 50. The fluorescence 13 of the second fluorescent dye excited by the light from the light source 49 is separated from the fluorescence 9 of the fluorescent particle by a beam splitter 51 and, after filtering by a filter 47, is detected by the detector 52. The fluorescence microscope 34 further includes a control unit 53 that generates control signals 54 to drive the scanner 42 and the EODs 36, and receives the detector signals 55 from the detectors 48, 52. The control unit 53 is configured to position the scanning light 5 at individual fluorescent particles using the scanner 42 and to track individual particles in the sample by repeatedly scanning them with the scanning light in a close range and making position determinations from the scanning positions and intensities or photon numbers of fluorescence 9 detected at the scanning positions. During the tracking of individual fluorescent particles, the control unit 53 receives a fluorescence 13 as a second measured variable from the sample 19 and terminates the tracking of a particle when a termination criterion is reached, which here is the falling below of a minimum intensity of the second measured variable, i.e., the fluorescence 13.

LIST OF REFERENCE SIGNS

1 Cell
2 Particle
3 Initial position
4 Scanning position
5 Scanning light
6 Excitation light
7 Intensity distribution
8 Local intensity minimum
9 Fluorescence
10 Trajectory
11 Second measured variable
12 Control value
13 Fluorescence
14 Fluorescent dye
15 Coloring
16 Minimum value
17 Termination
18 Trajectory
19 Sample
20 Objective
21 Nucleus
22 Filaments
23 Light beam
24 Transmission direction
25 Objective
26 Transmitted light
27 Illumination light
28 Second Harmonic Generation (SHG) light
29 Ion channel
30 Micropipette
31 Electrode
32 Electric current
33 Measuring amplifier
34 Light microscope
35 Light source
36 Electro-optical deflector (EOD)
37 Phase modulation element
38 Liquid crystal modulator
39 Beam coupler
40 Main beam path
41 Scan lens
42 Scanner
43 Tube lens
44 Pinhole
45 Lens
46 Lens
47 Filter
48 Detector
49 Light source
50 Beam coupler
51 Beam splitter
52 Detector
53 Control unit
54 Control signal
55 Detector signal

The invention claimed is:

1. A method for recording a trajectory of an individual particle in a sample starting from an at least approximately known initial position of the particle, comprising the repeatedly executed method steps:
   scanning the particle with an intensity distribution of a scanning light comprising a local minimum at one or more scanning positions;
   detecting a number of photons or a light intensity emitted from the particle as a result of the illumination with the scanning light at each of the scanning positions as a first measured variable in a first detection channel;
   determining updated coordinates of the particle from the photon number or light intensity detected at the scanning positions and adding the updated coordinates to the trajectory,
   wherein during the recording of the trajectory a second measured variable is detected in the sample in a second detection channel and the recording of the trajectory is interrupted or terminated if the second measured variable or a control value calculated from the second measured variable fulfills a termination criterion, wherein the second measured variable is an optical measured variable detected in a vicinity around the current coordinates of the particle in the sample.

2. The method according to claim 1, wherein the optical power of the scanning light is adapted in the course of several determinations of updated coordinates of the particle.

3. The method according to claim 1, wherein the particle is a fluorescent particle or a fluorescent dye molecule.

4. The method according to claim 3, wherein the scanning light is a fluorescence excitation light that excites the particle to fluoresce, or the scanning light is a superposition of a fluorescence excitation light and a fluorescence inhibition light, wherein the fluorescence inhibition light comprises the intensity distribution comprising the local intensity minimum.

5. The method according to claim 3, wherein the first measured variable and the second measured variable are fluorescence signals detected in different wavelength ranges.

6. The method according to claim 5, wherein the control value is calculated from the fluorescence signal and a further fluorescence signal.

7. The method according to claim 5, wherein the control value is a quantity calculated from the fluorescence intensity or from the fluorescence lifetime of the fluorescence signal or signals.

8. The method according to claim 3, wherein the second measured variable is a fluorescence of a further fluorescent dye in the sample.

9. The method according to claim 1, wherein the particle is scanned for each update of its coordinates at a plurality of scanning positions in a close range around the last determined coordinates.

10. The method according to claim 1, wherein the coordinates of the particle are updated after each scanning of the particle at a scanning position.

11. The method according to claim 1, wherein the termination criterion is fulfilled if the second measured variable or the control value falls below a minimum value or exceeds a maximum value.

12. The method according to claim 11, wherein the scanning is continued if the second measured variable or the control value exceeds the minimum value again or falls below the maximum value again.

13. The method according to claim 1, wherein the second measured variable is detected at the position of the scanning light in the sample.

14. The method according to claim 1, wherein the second measured variable is detected at a stationary position or in a stationary region of the sample.

15. The method according to claim 1, wherein the second measured variable is a second-harmonic generation signal, a third-harmonic generation signal, a Rayleigh or Raman scattered light signal, a coherent anti-Stokes Raman scattering, a reflected light signal, a differential interference contrast signal, or a polarization contrast signal.

16. The method according to claim 1, wherein the signal detected as the second measured variable is generated by illuminating the sample with light which is irradiated into the sample at an angle of between 15° and 165°.

17. The method according to claim 1, wherein the control value calculated from the second measured variable is a viability, vitality or cell cycle indicator of a cell located in the sample.

18. A light microscope comprising
an objective,
a light source for scanning light,
beam shaping means for forming an intensity distribution of the scanning light comprising a local intensity minimum in a sample,
a scanning device for positioning the scanning light in the sample,
a first detection channel for detecting a first, optical measured variable in the sample,
a second detection channel for detecting a second, optical measured variable in a vicinity around the current coordinates of the particle in the sample,
wherein the light microscope is configured to perform a method according to claim 1.

19. The method according to claim 1, wherein the sample is illuminated in addition to the scanning light with further light which selectively excites a signal of the second optical measured variable.

20. A method for recording a trajectory of an individual particle in a sample starting from an at least approximately known initial position of the particle, comprising the repeatedly executed method steps:
scanning the particle with an intensity distribution of a scanning light comprising a local minimum at one or more scanning positions;
detecting a number of photons or a light intensity emitted from the particle as a result of the illumination with the scanning light at each of the scanning positions as a first measured variable;
determining updated coordinates of the particle from the photon number or light intensity detected at the scanning positions and adding the updated coordinates to the trajectory,
wherein during the recording of the trajectory a second measured variable is detected in the sample and the recording of the trajectory is interrupted or terminated if a control value calculated from the second measured variable fulfills a termination criterion, wherein the second measured variable is an electrical measured variable measured by an electrode in the sample.

* * * * *